US011747457B2

(12) United States Patent
Kahana et al.

(10) Patent No.: US 11,747,457 B2
(45) Date of Patent: Sep. 5, 2023

(54) MULTI-STATIC RADAR SYSTEM FOR AUTOMOBILE RADAR SENSING

(71) Applicant: Intel Corporation, Santa Clara, CA (US)

(72) Inventors: Yaron Kahana, Kfar Saba (IL); Dan Ohev Zion, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 1067 days.

(21) Appl. No.: 16/452,383

(22) Filed: Jun. 25, 2019

(65) Prior Publication Data
US 2019/0339373 A1 Nov. 7, 2019

(51) Int. Cl.
*G01S 13/00* (2006.01)
*G01S 13/931* (2020.01)
*G01S 7/03* (2006.01)

(52) U.S. Cl.
CPC ............ *G01S 13/003* (2013.01); *G01S 7/032* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 2019/0375422 | A1* | 12/2019 | Shtrom | G01S 13/931 |
| 2020/0309942 | A1* | 10/2020 | Kunz | G01S 13/931 |
| 2020/0393558 | A1* | 12/2020 | Orr | G01S 13/9027 |

\* cited by examiner

*Primary Examiner* — Whitney Moore
(74) *Attorney, Agent, or Firm* — Schwabe, Williamson & Wyatt, P.C.

(57) ABSTRACT

Apparatuses, methods, and storage media associated with automotive radar sensing, are disclosed herein. In some embodiments, a multi-static radar system formed with at least a first and a second radar sensor is provided to a vehicle. At least one of the first and second radar sensors include a plurality of transmitters and a plurality of receivers. The first and second radar sensors are placed at first and second locations of the vehicle, at a distance from each other, to provide the system with an angular resolution that is smaller than either of the native angular resolutions of the first and second radar sensors. Other embodiments are also described and claimed.

25 Claims, 9 Drawing Sheets

MULTI-STATIC RADAR SYSTEM FOR AUTOMOBILE RADAR SENSING

TECHNICAL FIELD

The present disclosure relates to the fields of radar, and computer-assisted or autonomous driving (CA/AD). More particularly, the present disclosure relates to a multi-static radar system for automobile radar sensing by a CA/AD vehicle.

BACKGROUND

CA/AD vehicles will enjoy greater imaging radar capability at angular resolution as low as possible, targeting angular resolutions lower than 0.2°. Achieving <0.2° angular resolution image requires high antenna apertures, which in the automotive band of 79 GHz (wavelength of 3.8 mm) will require a non-practical or expensive radar antenna size of ~100 cm.

Prior solutions include the use of Light Distance and Ranging Radar (LiDAR) or Synthetic Aperture Radar (SAR). LiDARs are relatively expensive. High resolution LiDAR today can cost ~$80 K, with trends within the next several years to get into the $1000/unit, due to multiple technological risks. LiDARs are also inherently sensitive to weather (fog, rain, snow, and so forth) and challenged with low reflectivity objects (shiny or black). SAR performance depends on vehicle movement. It may completely lack functionality if vehicle is not moving and will be severely challenged to provide high angular resolution in the direction of the movement (boresight).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
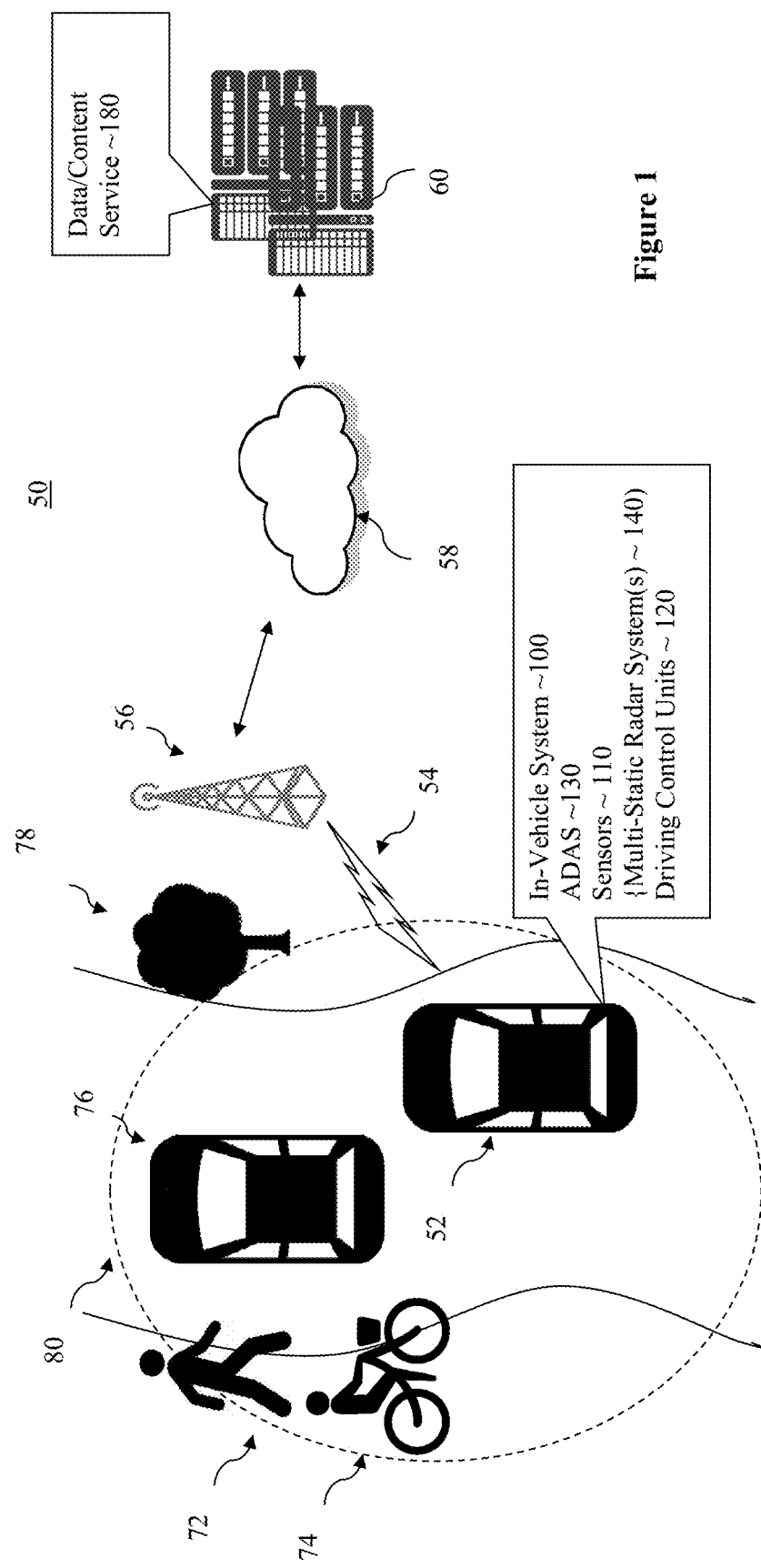
FIG. 1 illustrates an overview of an environment for incorporating and using the multi-static radar technology of the present disclosure for automotive radar sensing, in accordance with various embodiments.

To address the challenges described in the Background section, apparatuses, methods, and storage media associated with multi-static radar systems for automotive radar sensing, are disclosed herein. In various embodiments, one or more multi-static radar systems are provided to a CA/AD vehicle. Each multi-static radar system is formed with at least a first radar sensor, a second radar sensor, and a system processor. The at least first and second radar sensors are complementarily placed in the vehicle, at a distance from each other, and synchronized to operate coherently to provide radar measurements to the system processor, which in turn, processes the radar measurements to generate radar point clouds of the surrounding of the CA/AD vehicle. Through the complementary placements and synchronized/coherent operations of the member radar sensors, the desired angular resolution $\theta_{RS}$ of the multi-static radar system formed with the at least first and second radar sensors is less than the native angular resolutions $\theta_{rs1}$ and $\theta_{rs2}$ of the first and second radar sensors. In some embodiments, the desired angular resolution $\theta_{RS}$ of less than 0.2° is achieved for each of multi-static radar systems disposed in the CA/AD vehicle.

In various embodiments, each of the first and second radar sensors of a multi-static radar system includes a plurality of transmitters, a plurality of receivers, and a sensor processor, integrated in a package. By virtue of the complementary placements of the member radar sensors in the CA/AD vehicle, at a distance from each other, the plurality of transmitters and receivers and the sensor processor of each radar sensor can nonetheless be integrated into a relatively small package, that results in a native angular resolution of the radar sensor, $\theta_{rsi}$, that is greater than the system's angular resolution of $\theta_{RS}$.

In the following detailed description, these and other aspects of the multi-static radar technology for automotive radar sensing will be further described. References will be made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" or "engine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an environment for incorporating and using the multi-static radar system technology of the present disclosure for automotive radar sensing, in accordance with various embodiments, is illustrated. As shown, for the illustrated embodiments, example environment 50 includes CA/AD vehicle 52 having ADAS 130, one or more multi-static radar systems 140 of the present disclosure, for automotive radar sensing, and driving control units (DCU) 120. In addition, CA/AD vehicle 52 includes an engine, transmission, axles, wheels and so forth (not shown). As CA/AD vehicle 52 drives on a roadway, which may be an alley, a street, a boulevard, or a highway, the roadway may be straight or curvy. The road surface condition may be dry and good, or slippery, i.e., wet or icy due to current or recent past precipitations, rainfall or snow. The visibility may be good or poor due to heavy precipitation or fog. Additionally, in its surrounding area 80, there may be other vehicles, e.g., vehicle 76, pedestrian 72, bicyclist 74, objects, such as tree 78 or road signs (not shown). CA/AD vehicle 52 may be operated manually by a human driver, but computer-assisted, or autonomously driven by ADAS 130, controlling DCUs 120, which in turns, control the engine, the transmission, the brakes, and so forth of CA/AD vehicle 52.

ADAS 130 is configured with computer vision to recognize stationary or moving objects (such as tree 78, moving vehicle 76, bicyclist 74 and pedestrian 72) in surrounding area 80. In various embodiments, ADAS 130 is configured to recognize these stationary or moving objects in area 80 surrounding CA/AD vehicle 52, and in response, make its decision in controlling DCUs 120 of vehicle 52. For the illustrated embodiments, ADAS 130 is assisted by multi-static radar systems 140 in sensing for objects, such as vehicle 76, pedestrian 72, bicyclist 74, objects, such as tree 78 or road signs (not shown), in its surrounding 80. As noted earlier, each multi-static radar system 140 is formed with at least a first radar sensor, a second radar sensor, and a system processor. The at least first and second radar sensors are complementarily placed on the vehicle, at a distance from each other, and synchronized to operate coherently to provide radar measurements to the system processor, which in turn, processes the radar measurements to generate radar point clouds of the surrounding of the CA/AD vehicle. Through the complementary placements and synchronized/coherent operations of the member radar sensors, the desired angular resolution $\theta_{RS}$ of less than 0.2° is achieved for each of multi-static radar systems disposed in the CA/AD vehicle.

Further, each of the first and second radar sensors of a multi-static radar system includes a plurality of transmitters, a plurality of receivers, and a sensor processor, integrated in a package. By virtue of the complementary placements of the member radar sensors in the CA/AD vehicle, at a distance from each other, the plurality of transmitters and receivers and the sensor processor of each radar sensor can nonetheless be integrated into a relatively small package, that results in a native angular resolution of the radar sensor, $\theta_{rst}$, that is greater than the system's angular resolution of $\theta_{RS}$.

These and other aspects of the radar sensors and the multi-static radar systems 140 will be further described with references to FIGS. 2-7.

Still referring to FIG. 1, in various embodiments, CA/AD vehicle 52 may further include various other sensors 110, and ADAS 130 may further assist or control operations of vehicle 52, controlling DCUs 120, based additionally on sensor data provided by sensors 110. Sensors 110 may include in particular one or more cameras (not shown) to capture pictorial images of surrounding area 80 of vehicle 52. In various embodiments, sensors 110 may also include accelerometers, inertial units, gyroscopes, global positioning system (GPS) circuitry, pressure sensors, and so forth. These other sensors may collect a wide range of sensor data about vehicle 52 and/or other objects in the surrounding area 80, including but are not limited to, inertial data of the vehicle, dimensions, shape, type (car, motorbike, etc) of nearby vehicles, lights and sound of nearby vehicles (e.g., in case of emergency vehicle), and so forth.

In various embodiments, CA/AD vehicle 52 further includes in-vehicle system (IVS) 100, which may include navigation subsystem (not shown) configured to provide navigation guidance. IVS 100 may further include a number of infotainment subsystems/applications, e.g., an instrument cluster subsystem/application, front-seat infotainment subsystem/application, such as, a navigation subsystem/application, a media subsystem/application, a vehicle status subsystem/application and so forth, and a number of rear seat entertainment subsystems/applications (not shown).

In various embodiments, IVS 100 and ADAS 130, on their own or in response to user interactions, communicate or interact 54 with one or more remote/cloud servers 60, nearby vehicles, e.g., vehicle 76, and/or nearby personal systems, e.g., personal systems worn by pedestrian 72/bicyclist 74. In particular, in various embodiments, remote/cloud servers 60 include data/content services 180. Examples of data/content provided by data/content service 180 may include, but are not limited, road and/or weather conditions of various roadways at various points in time. The data/content may be gathered by service 180 and/or received from various third parties, e.g., reported by other vehicles 76 traveling through those road segments. Service 80 may compile, aggregate, condense, summarize, the gathered/received data, as well as extrapolate and/or provide projections based on the gathered/received data. Similarly, IVS 100 and/or ADAS 130 may receive data/contents, in particular, weather/environmental data, from systems on nearby vehicle 76 and/or personal systems worn by pedestrian 72/bicyclist 76.

In various embodiments, IVS 100 and ADAS 130 may communicate 54 with server 60 via cellular communication, e.g., via a wireless signal repeater or base station on transmission tower 56 near vehicle 52, and one or more private and/or public wired and/or wireless networks 58. Examples of private and/or public wired and/or wireless networks 58 may include the Internet, the network of a cellular service provider, and so forth. It is to be understood that surrounding area 80 and transmission tower 56 may be different areas and towers at different times/locations, as vehicle 52 travels enroute to its destination. In various embodiments, ADAS 130 may be equipped to communicate with other vehicles 76 and/or personal systems worn by pedestrian 72/bicyclist 74 directly via WiFi or dedicated short range communication (DSRC) in accordance with selected inter-vehicle or near field communication protocols.

Except for the multi-static radar system technology of the present disclosure for automotive radar sensing, ADAS 130, IVS 100 and CA/AD vehicle 52 otherwise may be any one of a number of ADAS, IVS and CA/AD vehicles known in the art. Before further describing the multi-static radar system technology of the present disclosure, it should be noted that, while for ease of understanding, only one other vehicle 76, one object tree 78, one pedestrian 72 and one bicyclist 74 are illustrated, the present disclosure is not so limited. In practice, there may be multitude of other vehicles 76, objects 78, pedestrians 72 and bicyclist 74 in surrounding area 80. Further, the shape and size of surrounding area 80 considered may vary from implementation to implementation.

Figure 2:
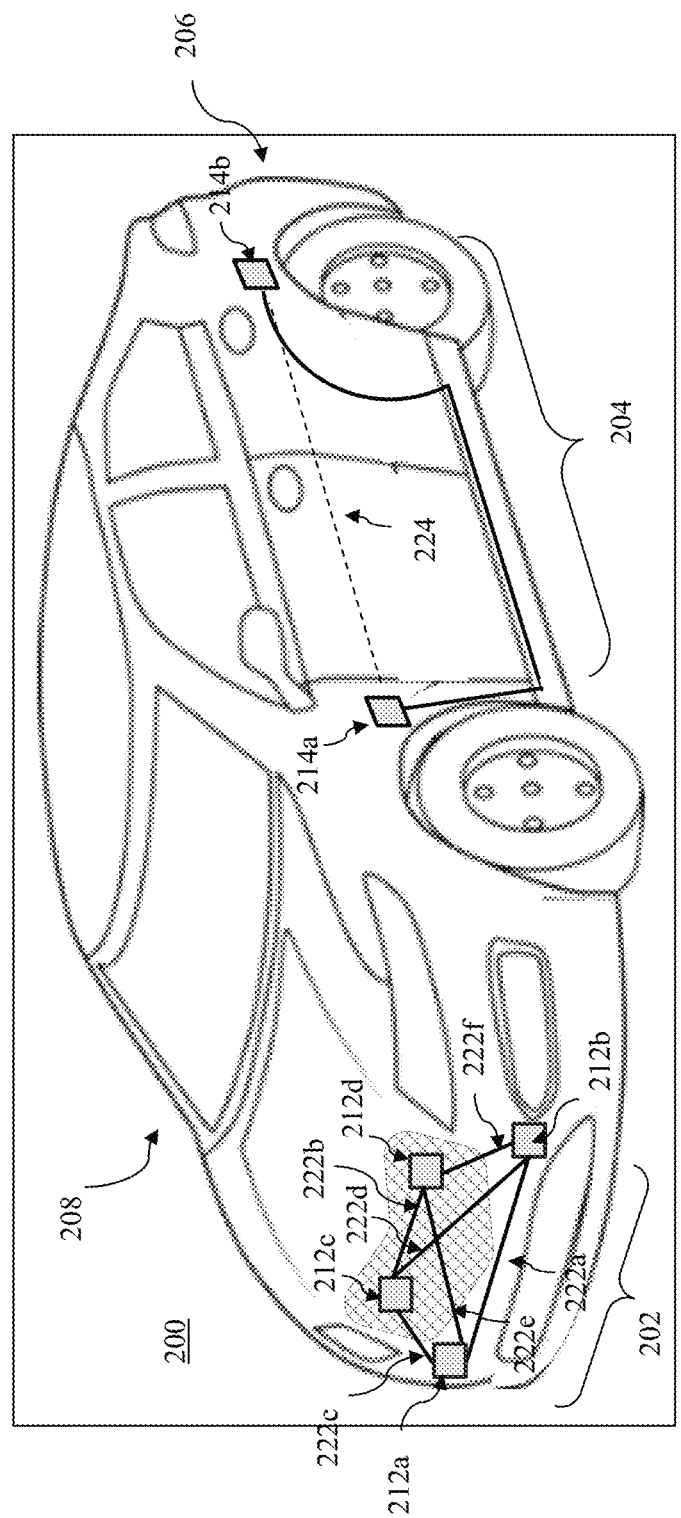
FIG. 2 illustrates a perspective view of an example CA/AD vehicle incorporated with the multi-static radar technology of the present disclosure, according to various embodiments.

Referring now to FIG. 2, wherein a perspective view of an example CA/AD vehicle incorporated with the multi-static radar technology of the present disclosure, according to various embodiments, is illustrated. As shown, vehicle 200, which may be vehicle 52 of FIG. 1, is provided with a plurality of multi-static radar systems 202-208 of the present disclosure. For the illustrated embodiments, vehicle 200 is provided with multi-static radar system 202 at the front end of vehicle 200, multi-static radar systems 204 on the left side of vehicle 200, multi-static radar systems 206 at the rear end of vehicle 200, and multi-static radar systems 208 on the right side of vehicle 200. Multi-static radar systems 206 and 208 are not visible in detail in FIG. 2, by virtue of the view of FIG. 2. For the illustrated embodiments, multi-static radar systems 206 and 208 are respectively similarly constituted as multi-static radar systems 202 and 204. In alternate embodiments, multi-static radar systems 206 and 208 may be constituted differently, but according to the same principles as described below. Also, in other embodiments, vehicle 200 may have more or less radar systems 202-208, e.g., having only one radar system either at the front or the rear, or having additional one(s), such as roof mounted systems.

As described earlier, each multi-static radar system 202-208 is formed with at least a first radar sensor, a second radar sensor, and a system processor. In the case of multi-static radar system 202, it is formed with four radar sensors 212a-212d and a main system processor (not shown), whereas in the case of multi-static radar system 202, it is formed with two radar sensors 214a-214b and a main system processor (not shown).

For multi-static radar system 202, radar sensors 212a and 212b are complementarily disposed at first and second locations, at the front end of vehicle 200, at a distance $d_1$ along horizontal axis 222a from each other. Similarly, radar sensors 212c and 212d are complementarily disposed at third and fourth locations, at the front end, at a distance $d_2$ along horizontal axis 222b from each other. By virtue of its location, radar sensor 212c is at distances $d_3$ and $d_4$ along angular axes 222c and 222d from radar sensors 212a and 212b respectively. Similarly, radar sensor 212d is at distances $d_5$ and $d_6$ along angular axes 222e and 222f from radar sensors 212a and 212b respectively. In alternate embodiments, radar sensors 212c and 212d may be respectively disposed above radar sensors 212a and 212d, i.e., at distances along respective vertical axes.

For multi-static radar system 204, radar sensors 214a and 214b are disposed at fifth and sixth locations, at the left side, at a distance $d_5$ along horizontal axis 224 from each other. Similarly, in alternate embodiments, radar sensors 214b may be disposed above radar sensor 214a or vice versa, i.e., at a distance along a vertical axis, or additionally, at an offset from each other, i.e., at a distance along an angular axis.

The angular resolution (in degrees) of a multi-static radar system for automotive radar sensing is given by the formula 50.8*λ/(Dt+Dr), where λ is about 3.7-3.9 mm (reference can be 3.9 mm) for automotive band of communication of 76-81 GHz, and (Dt+Dr) is the sum of the farthest distances between the member transmitters and between the member receivers of the multi-static radar system. As described earlier, each of radar sensors 212a-212d and 214a-214b includes a plurality of transmitters (Tx) and a plurality of receivers (Rx), thus each of the distances $d_1$-$d_5$ substantially corresponds to the quantity (Dt+Dr) in determining the angular resolution of multi-static radar system 202 and 204. Accordingly, in various embodiments, each of the distances $d_1$-$d_5$ is no closer than 1,000 mm, thereby providing an angular resolution $\theta_{RS}$ of 50.8*3.9 mm/1000 mm<0.2° for each multi-static radar system 202-208.

In various embodiments, the plurality of Tx and the plurality of Rx of each of radar sensors 212a and 212d and 214a and 214b are integrated in an integrated circuit (IC) package with each of the maximum distances between the Tx (a) and between the Rx ($D_r$) to be approximately 100 mm (meaning Dt+Dr=200 mm). Accordingly, the native angular resolutions $\theta_{rsi}$ of each of radar sensors 212a-212d and 214a-214b is 50.8*3.9/200=0.99°, but without impacting the <0.2° angular resolution $\theta_{RS}$ of each of the multi-static radar systems 202-208.

Still referring to FIG. 2, in various embodiments, each of multi-static radar systems 202-208 is provided with its own main system processor; in other words, one for multi-static radar system 202, one for multi-static radar system 204, one for multi-static radar system 206, and one for multi-static radar system 208. In other embodiments, some or all of multi-static radar systems 202-208 may share the same main system processor, e.g., multi-static radar systems 202 and 204 sharing one main system processor, while multi-static radar system 206 and 208 share another, or alternatively, all multi-static radar systems 202-208 share the same system processor.

In various embodiments, radar sensors 212a-212d and 214a-214b of each multi-static radar system 202-208 may be coupled with the main system processor via a wire line, or via a system bus, e.g., a serial bus. In other embodiments, radar sensors 212a-212d and 214a-214b of each multi-static radar system 202-208 may be coupled to the main system processor wirelessly, via a dedicated communication or radar channel. In various wireless embodiments, the wireless communication channels may be in unregulated frequencies, but proximally located near the regulated frequencies of 79 GHz for vehicular communication.

Figure 3:
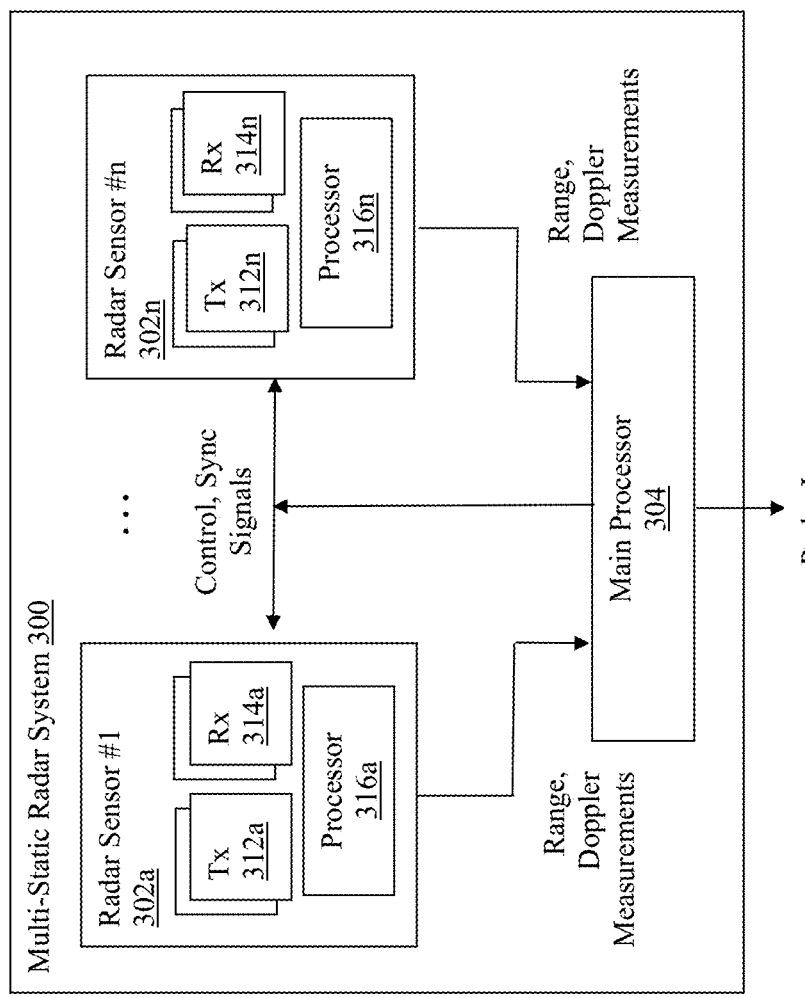
FIG. 3 illustrates a component view of an example multi-static radar system of the present disclosure, according to various embodiments.

Referring now to FIG. 3, wherein a component view of an example multi-static radar system of the present disclosure, according to various embodiments, is illustrated. As shown, multi-static radar system 300, which may be one of multi-static radar systems 140 of FIG. 1 or one of multi-static radar systems 202-208 of FIG. 2, includes n number of radar sensors 302a-302n and main processor 304, communicatively coupled with each other as shown. In various embodiments, sensors 302a-302n and main processor 304 may be communicatively coupled with each other wirelessly using ultra-wide band signals, over a dedicated radar or communication channel, e.g., at an unregulated frequency near the regulated vehicle communication frequency band. In various embodiments, radar sensors 302a-302n may be physically coupled to main processor 304 via a wire line or a system bus, e.g., a serial bus. In various wired embodiments, the wiring may include one or more dedicated lines to distribute a common clock to the radar sensor 302a-302n. In alternate embodiments, the common clock may be embedded or modulated in data/control signals. For these embodiments, each radar sensor 302a-302n would extract the common clock. Further, each radar sensor 302a-302n includes a number of Tx 312a-312n, a number of Rx 314a-314n, and a sensor processor 316a-316n.

As described earlier, radar sensors 302a-302n are complementarily placed in various locations of a CA/AD vehicle, where the distance separating each pair of radar sensors 302a-302n is at least 1,000 mm, and synchronized to operate coherently, to provide the desired <0.2° angular resolution ORS for multi-static radar system 300. In particular, main system processor 304 is arranged to provide the control, sync signals to radar sensors 302a-302n to synchronize them, in timing, frequency and/or phase to cause them to operate coherently.

Tx 312a-312n are arranged to transmit electromagnetic (EM) signals into the surrounding of the host CA/AD vehicle, e.g., to the area in front of the CA/AD vehicle if multi-static radar system 300 is disposed at the front end of the CA/AD vehicle, to the area at the right side of the CA/AD vehicle if multi-static radar system 300 is disposed at the right side of the CA/AD vehicle, to the area at the rear of the CA/AD vehicle if multi-static radar system 300 is disposed at the rear end of the CA/AD vehicle, and to the area at the left of the CA/AD vehicle if multi-static radar system 300 is disposed at the left side of the CA/AD vehicle.

Rx 314a-314n are arranged to receive the reflections of the EM signals transmitted by Tx 312a-312n of the same radar sensor 302a-302n, as well as EM signals transmitted by Tx 312a-312n of other radar sensors 302a-302n, reflected off targets/objects in the surrounding area (front, right, rear, or left) of the host CA/AD vehicle.

Sensor processors 316a-316n are arranged to process the reflections of the EM signals received by respective Rx 314a-314n, and outputs various radar measurements for main system processor 304. Examples of radar measurements include, but are not limited to range and doppler measurements.

Main system processor 304 is further arranged to process the various radar measurements provided by various radar sensors 302a-302n and output radar point clouds of the surrounding area (front, right, rear, or left) of the host CA/AD vehicle. Main system processor 304 may process the various radar measurements provided by various radar sensors 302a-302n to generate radar point clouds in any one of radar point cloud generation processes known in the art. In various embodiments, main system processor 304 may process the various radar measurements provided by various radar sensors 302a-302n to generate four dimensional (4D) radar point clouds (3D position plus velocity) in accordance with the techniques described in co-pending application Ser. No. 16/442,100, entitled "Software Define Radar," filed on Jun. 14, 2019.

In alternate embodiments, in lieu of having dedicated main system processor 304 provides the control and/or synchronization signals to radar sensors 302a-302n to synchronize them to operate coherently, radar sensors 302a-302n may synchronize themselves to each other for coherent operation by processing the received direct leakage of the transmitted EMF signals of the various other radar sensors 302a-302n. Radar sensors 302a-302n may then synchronize themselves to other for coherent operation based on the results of the processing, i.e. the timing, frequency and/or phase of the detected signals.

In alternate embodiments, in lieu of the provision of a dedicated main system processor 304, with sufficient computing capabilities, one of sensor processors 316a-316n may also serve as main system processor 304, providing the control and sync signals to the other radar sensors 302a-302n, and processing the radar measurements collected by its own Rx 314a-314n, as well as radar measurements collected by Rx 314a-314n of other radar sensors 302a-302n, to generate radar point clouds for multi-static radar system 300.

Except for their usage to form radar sensors 302-302n, and in turn, multi-static radar system 300, Tx 312a-312n, Rx 314a-314n, sensor processors 316a-316n, and main system processor 304 may be any one of a number of transmitters, receivers, and processor elements known in the art.

In various embodiments, Tx 312a-312n transmit signal with frequency changing linearly with time. In other words, multi-static radar system 300 formed with radar sensors 302a-302n is a frequency-modulated continuous wave (FMCW) radar system. In alternate embodiments, Tx 312a-312n may transmit signals in other wave forms, forming other radar systems. In various FMCW embodiments, each radar sensors 302a-302n include six transmitters and four receivers.

Before further describing the operation flows of radar sensors 302a-302n, and the operation flow of multi-static radar system 300, it should be noted that, in addition to being used in conjunction with other radar sensors 302a-302n, each radar sensor 302a-302n may be used as a standalone radar sensor.

Figure 4:
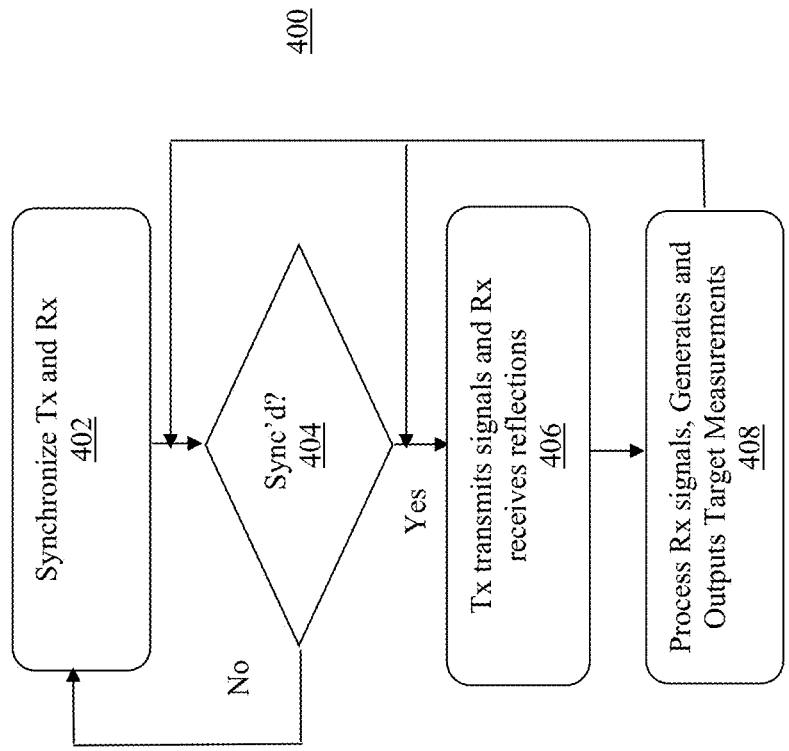
FIG. 4 illustrates an example operation flow of a radar sensor of a multi-static radar system, according to various embodiments.

Referring now to FIG. 4, wherein an example operation flow of a radar sensor of a multi-static radar system, according to various embodiments, is illustrated. As shown, for the illustrated embodiments, operation flow 400 for a radar sensor includes operations performed at blocks 402-408. The various operations at blocks 402-408 may be performed e.g., by the Tx, the Rx, and the sensor processors earlier described with references to FIG. 3.

Operation flow 400 starts at block 402. At block 402, the Tx and Rx of a radar sensor are synchronized to operate coherently with each other, e.g., in terms of their timing, operating frequencies, and phases. Synchronization is typically an iterative process, thus a determination is made at block 404 on whether the Tx and Rx of a radar sensor are substantially synchronized and operating coherently. If the radar sensor is part of a multi-static radar system, the Tx and Rx of a radar sensor are not just synchronized to operate coherently with each other, but synchronized to operate coherently with other Tx and Rx of other radar sensors of the multi-static radar system. If not, the operation flow continues at 402 until the Tx and Rx of a radar sensor are substantially synchronized and operating coherently as required.

Next, at block 406, on synchronization of the Tx and Rx of a radar sensor to operate coherently, the Tx are caused to transmit EM signals into the surrounding of the host CA/AD vehicle, and Rx receives the reflections of the EM signals transmitted by the Tx of the same radar sensor as well as reflections of the EM signals transmitted by the Tx of other radar sensors, reflected off targets/objects in the surrounding. At block 408, the received reflections are processed to output various radar measurements, e.g., range and/or doppler measurements, for the radar sensor. It should be noted that as each Rx is in sync with all Tx, within the same radar sensor as well as in other radar sensors, each Rx can generate several separate outputs associated with how the specific Rx received the reflection created by various ones of Tx, within the same radar sensor, as well as in other radar sensors.

Figure 5:
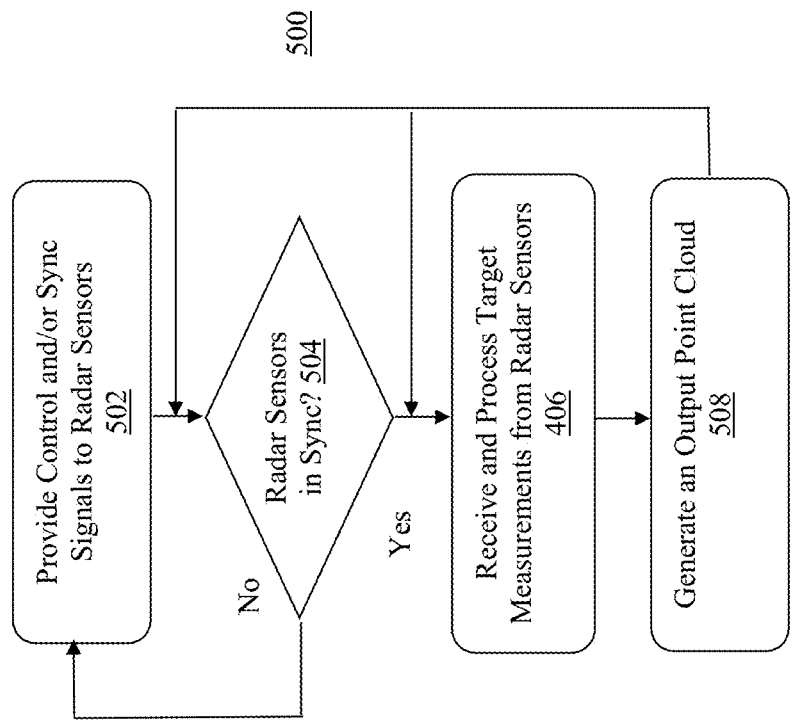
FIG. 5 illustrates an example operation flow of a multi-static radar system, according to various embodiments.

Referring now to FIG. 5, wherein an example operation flow of a multi-static radar system, according to various embodiments, is illustrated. As shown, for the illustrated embodiments, operation flow 500 for a multi-static radar system includes operations performed at blocks 502-508. The various operations at blocks 502-508 may be performed e.g., by the radar sensors and the main system processor earlier described with references to FIG. 3.

Operation flow 500 starts at block 502. At block 502, the radar sensors of a multi-static radar system are synchronized to operate coherently with each other, e.g., in terms of their timing, operating frequencies, and phases. That is, all the Tx and Rx of all radar sensors of the system are substantially synchronized and operating coherently. Synchronization is typically an iterative process, thus a determination is made at block 504 on whether the radar sensors of the multi-static radar system are substantially synchronized and operating coherently. If not, the operation flow continues at 502 until the radar sensors of the multi-static radar system are substantially synchronized and operating coherently.

Next, at block 506, on synchronization of the radar sensors of the multi-static radar system to operate coherently, various radar measurements, e.g., range and/or doppler measurements, are received from the radar sensors of the multi-static radar system. At block 508, the received radar measurements from the various radar sensors are processed to generate radar point clouds for the multi-static radar system.

Figure 6:
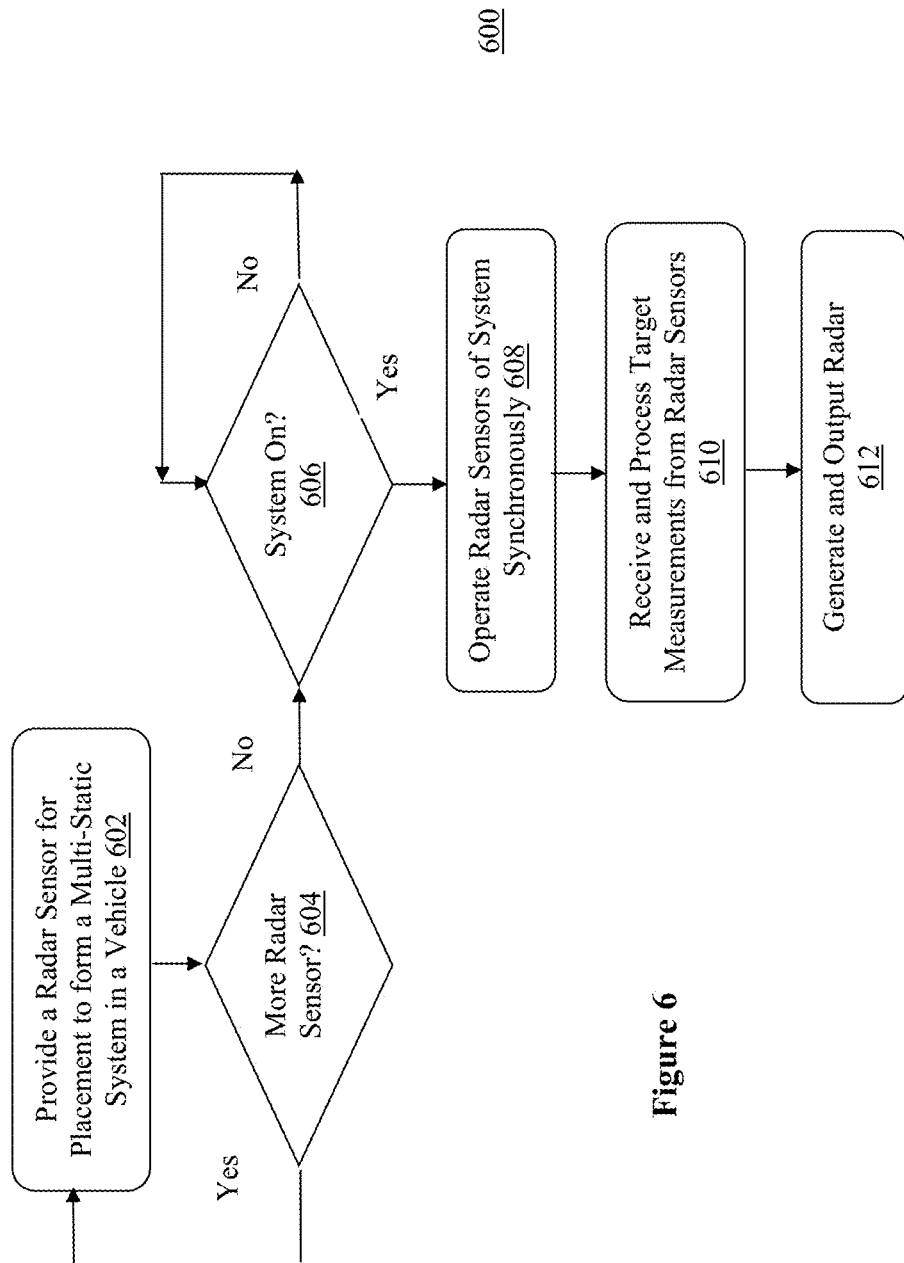
FIG. 6 illustrates an example method for automotive radar sensing, according to various embodiments.

Referring now to FIG. 6, wherein an example method for automotive radar sensing, according to various embodiments, is illustrated. As shown, for the illustrated embodiments, operation flow 600 for automotive radar sensing includes operations performed at blocks 602-612. The various operations at blocks 602-612 may be performed e.g., by a manufacturer of CA/AD vehicle 52 of FIG. 1, or CA/AD vehicle 200 of FIG. 2.

Operation flow 600 starts at block 602. At block 602, a radar sensor is provided for complementary placement at a location in a CA/AD vehicle to form a multi-static radar system in the CA/AD vehicle. Next, at block 604, a determination is made on whether additional radar sensors are to be provided for formation of the multi-static radar system. If additional radar sensors are to be provided, process 600 returns to block 602 where another radar sensor is provided for complementary placement. Process 600 continues until eventually all radar sensors for the formation of the multi-static radar system have been provided. At such time, from block 604, process 600 proceeds to block 606.

At block 606, a determination is made on whether to power on the multi-static radar system. If a result of the determination is negative, process 600 stays at block 606 until eventually it is time to power on the multi-static radar system. At such time, process 600 proceeds to block 608.

At block 608, control and sync signals are provided to the radar sensors of the multi-static radar system to synchronize the complementarily placed radar sensors of the multi-static radar system to operate coherently. Next, at block 610, radar measurements are received from the complementarily placed and synchronized/coherent radar sensors of the multi-static radar system. At block 612, the received radar measurements are processed to generate radar point clouds of the surrounding of the CA/AD vehicle. In various embodiments, the radar system may provide multiple point cloud outputs per second (e.g., 10 to 30 scans per seconds). Further, the radar system may perform periodically sync maintenance between the various radar sensors.

Figure 7:
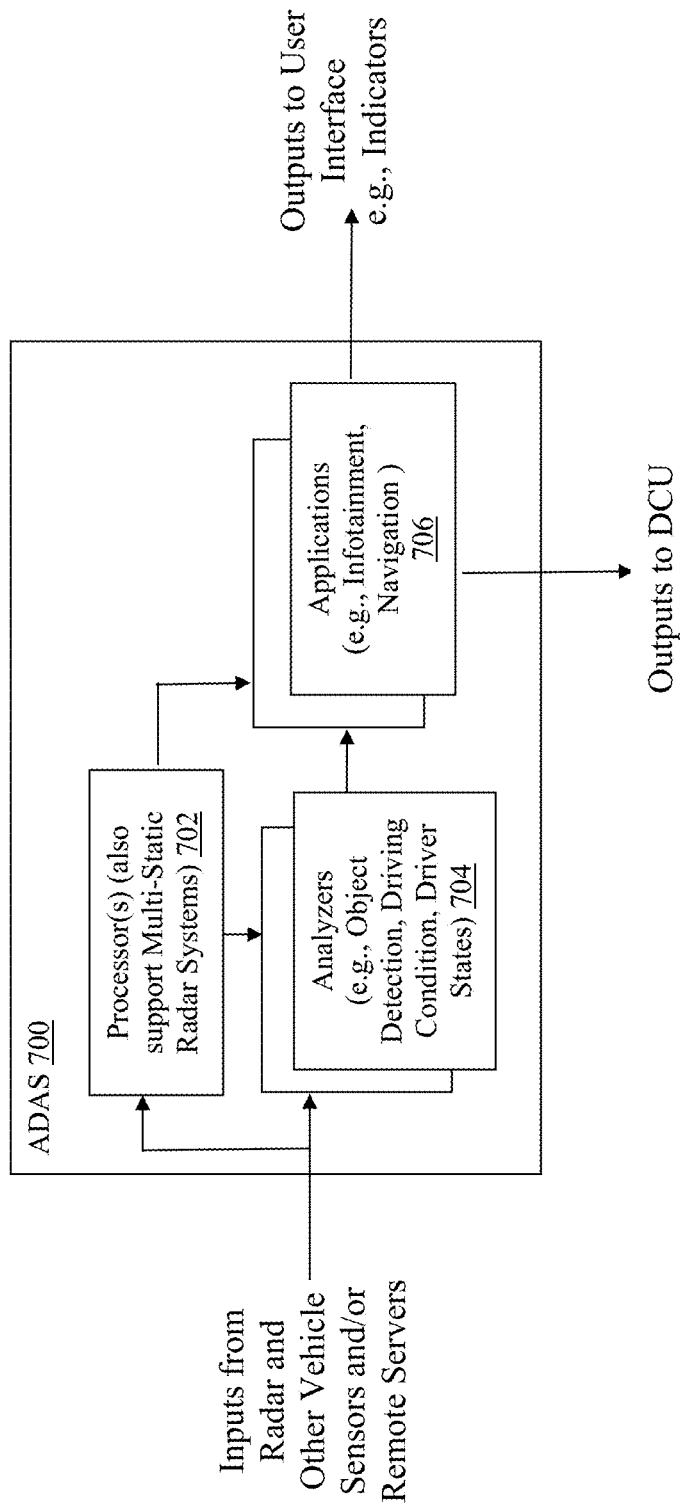
FIG. 7 illustrates a component view of an example Advanced Driving Assistance System (ADAS), according to various embodiments.

Referring now to FIG. 7, wherein a component view of an example Advanced Driving Assistance System (ADAS), according to various embodiments, is illustrated. As shown, for the illustrated embodiments, ADAS 300, which may be ADAS 130 of FIG. 1, includes one or more processors 702. Further ADAS 300 includes one or more analyzers 704 and one or more applications 706, operated by processors 702. In addition to the operations of analyzers 704 and applications 706, processors 702 also served as the main system processors of one or more multi-static radar systems of the host CA/AD vehicle. In other words, for these embodiments, in lieu of providing one or more main system processors respectively dedicated to the one or more multi-static radar systems of the host CA/AD vehicle, the one or more processors 702 of ADAS 700 are further arranged to respectively process the radar measurements output by the radar sensors of the respective multi-static radar systems, and generate radar point clouds for the respective multi-static radar systems.

Examples of analyzers 704 may include but are not limited to object detectors arranged to detect/recognize targets/objects in the surrounding of the host CA/AD vehicle, e.g., other vehicles, pedestrians, bicyclists, road signs, and so forth, as earlier mentioned when describing FIG. 1, an analyzer to determine driving conditions based on sensor data received from various sensors of host CA/AD vehicles, or an analyzer to determine a state (sober, alert, under influence and so forth) of an occupant of the host CA/AD vehicle.

Example applications may include but are not limited to e.g., infotainment systems, navigation systems, and so forth.

Figure 8:
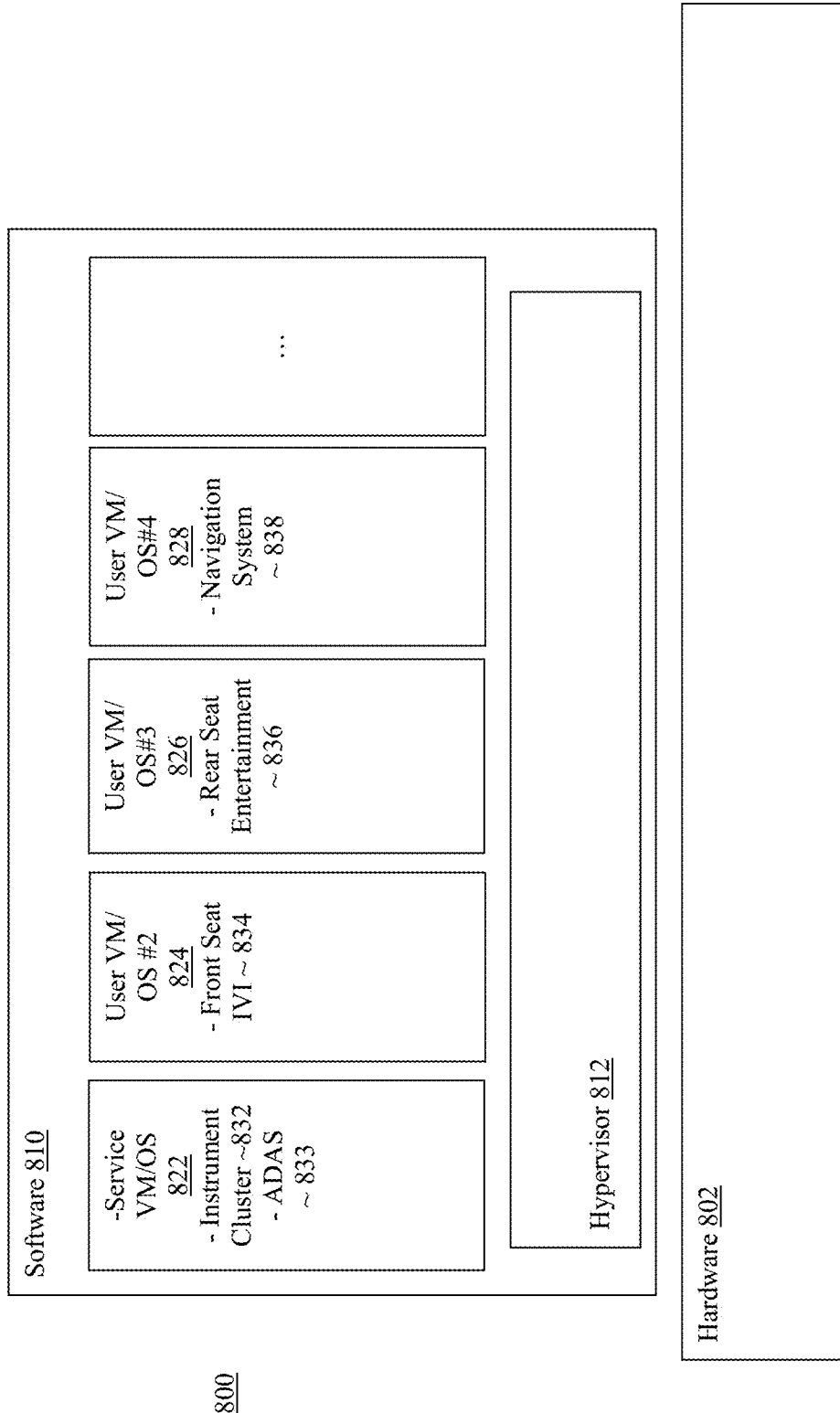
FIG. 8 illustrates a software component view of an in-vehicle system, according to various embodiments.

Referring now to FIG. 8, wherein a software component view of the in-vehicle system, according to various embodiments, is illustrated. As shown, for the embodiments, IVS system 800, which could be IVS system 100, includes hardware 802 and software 810. Software 810 includes hypervisor 812 hosting a number of virtual machines (VMs) 822-828. Hypervisor 812 is configured to host execution of VMs 822-828. The VMs 822-828 include a service VM 822 and a number of user VMs 824-828. Service machine 822 includes a service OS hosting execution of a number of instrument cluster applications 832 and an ADAS 833, e.g., ADAS 130 of FIG. 1 or 700 of FIG. 7, incorporated with aspects of the multi-static radar technology of the present disclosure. User VMs 824-828 may include a first user VM 824 having a first user OS hosting execution of front seat infotainment applications 834, a second user VM 826 having a second user OS hosting execution of rear seat infotainment applications 836, a third user VM 828 having a third user OS hosting execution of navigation subsystem 838, and so forth.

Elements 812-838 of software 810 may be any one of a number of these elements known in the art. For example, hypervisor 812 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 822 and user OS of user VMs 824-828 may be any one of a number of OS known in the art, such as Linux, available e.g., from Red Hat Enterprise of Raleigh, N.C., or Android, available from Google of Mountain View, Calif.

Figure 9:
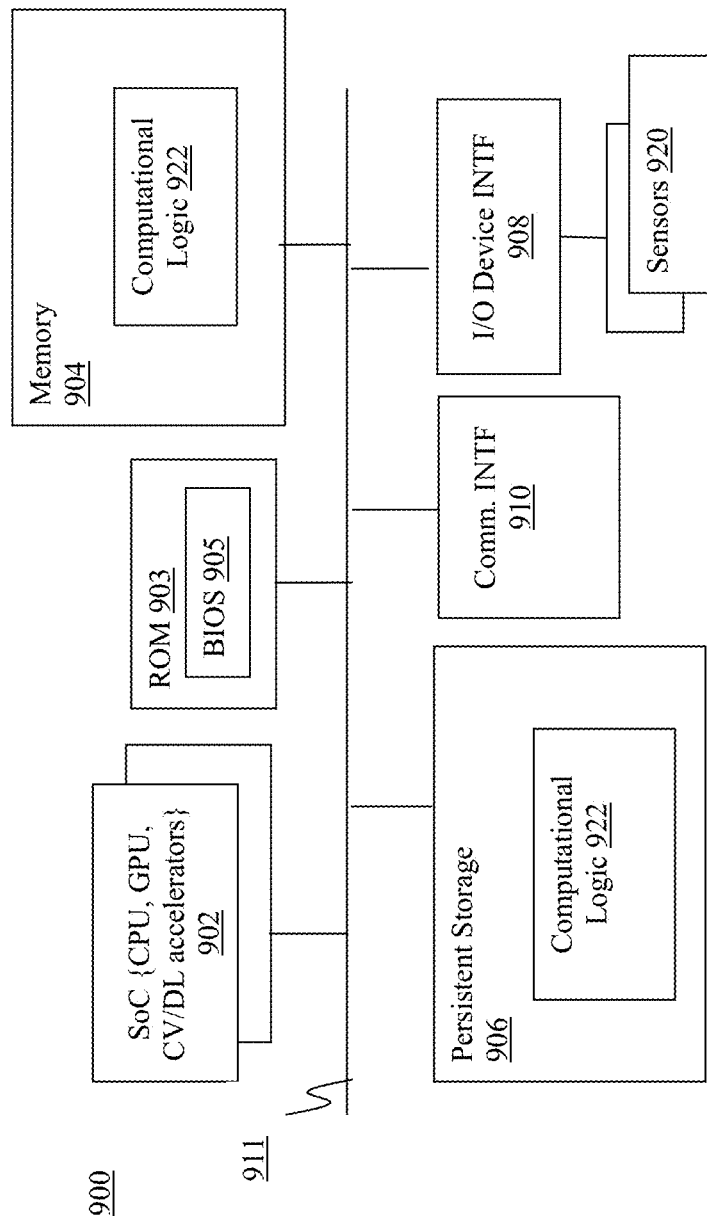
FIG. 9 illustrates a hardware component view of a computer platform, suitable for use as an in-vehicle system or a cloud server, according to various embodiments.

Referring now to FIG. 9, wherein an example computing platform that may be suitable for use to practice the present disclosure, according to various embodiments, is illustrated. As shown, computing platform 900, which may be hardware 802 of FIG. 8, or a computing platform of one of the servers 60 of FIG. 1, include one or more system-on-chips (SoCs) 902, ROM 903 and system memory 904. Each SoCs 902 may include one or more processor cores (CPUs), one or more graphics processor units (GPUs), one or more accelerators, such as computer vision (CV) and/or deep learning (DL) accelerators. ROM 903 may include basic input/output system services (BIOS) 905. CPUs, GPUs, and CV/DL accelerators may be any one of a number of these elements known in the art. Similarly, ROM 903 and BIOS 905 may be any one of a number of ROM and BIOS known in the art, and system memory 904 may be any one of a number of volatile storage devices known in the art.

Additionally, computing platform 900 may include persistent storage devices 906. Example of persistent storage devices 906 may include, but are not limited to, flash drives, hard drives, compact disc read-only memory (CD-ROM) and so forth. Further, computing platform 900 may include one or more input/output (I/O) interfaces 908 to interface with one or more I/O devices, such as sensors 920. Other example I/O devices may include, but are not limited to, a display, keyboard, cursor control and so forth. Computing platform 900 may also include one or more communication interfaces 910 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 911, which may represent one or more buses. In the case of multiple buses, they may be bridged by one or more bus bridges (not shown).

Each of these elements may perform its conventional functions known in the art. In particular, ROM 903 may include BIOS 905 having a boot loader. System memory 904 and mass storage devices 906 may be employed to store a working copy and a permanent copy of the programming instructions implementing the operations associated with hypervisor 812, service/user OS of service/user VM 822-828, or components of ADAS 833, collectively referred to as computational logic 922. The various elements may be implemented by assembler instructions supported by processor core(s) of SoCs 902 or high-level languages, such as, for example, C, that can be compiled into such instructions.

Figure 10:
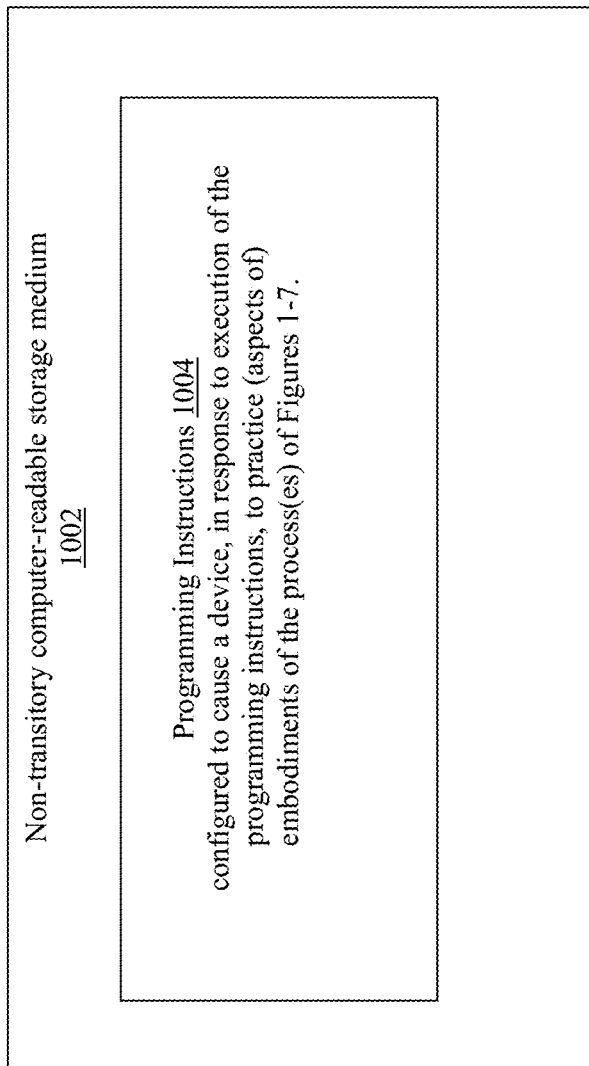
FIG. 10 illustrates a storage medium having instructions for practicing methods described with references to FIGS. 1-8, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure described with references to FIGS. 1-8. As shown, non-transitory computer-readable storage medium 1002 may include a number of programming instructions 1004. Programming instructions 1004 may be configured to enable a device, e.g., computing platform 1000, in response to execution of the programming instructions, to implement (aspects of) hypervisor 812, service/user OS of service/user VM 822-828, or components of ADAS 130, 700, or 833. In alternate embodiments, programming instructions 1004 may be disposed on multiple computer-readable non-transitory storage media 1002 instead. In still other embodiments, programming instructions 1004 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and descriptions, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is a radar sensor for automotive radar sensing, comprising: a first plurality of transmitters (TX) and a plurality of receivers (RX), co-located within a package for disposition at a location in a vehicle, wherein the first plurality of TX are arranged to transmit first electro-magnetic (EM) signals into a surrounding of the vehicle, and the plurality of RX are arranged to receive reflections of the first EM signals and reflections of second EM signals transmitted into the surrounding by a second plurality of TX located in at least another radar sensor disposed at another location in the vehicle, reflected off objects in the surrounding, the co-location of the first plurality of TX and the plurality of RX within the package providing a native angular resolution of $\theta_{rs1}$ for the radar sensor; and a physical processor co-disposed and coupled with the first plurality of TX and the plurality of RX, to control the transmission of the EM signals by the first plurality of TX, and to process the reflected first and second EM signals received by the plurality RX, to output a plurality of radar measurements to contribute in generation of a radar point cloud of the surrounding; wherein the radar sensor and the other radar sensor are respectively disposed at the location and the other location to form a multi-static radar system with an angular resolution $\theta_{RS}$ that is smaller than the native angular resolution $\theta_{rs1}$.

Example 2 is example 1, wherein the physical processor is further arranged to receive control or synchronization signals to synchronize its control of the transmission of the first EM signals by the first plurality of TX, and its processing of the reflected first and second EM signals received by the RX, to generate the plurality of radar measurements.

Example 3 is example 1, wherein physical processor is further arranged to provide the plurality of radar measurements to a main processor of the radar system, disposed on the vehicle.

Example 4 is example 3, wherein the main processor of the radar system is co-disposed with the physical processor in the radar sensor.

Example 5 is example 1, wherein the package is an integrated circuit (IC) package, and includes the physical processor.

Example 6 is example 1, wherein the physical processor is further arranged to synchronize its control of the transmission of the first EM signals by the first plurality of TX and its processing of the reflected first and second EM signals received by the RX, by processing received direct leakage of the second EM signals transmitted by the second plurality of TX in the at least another radar sensor disposed at the another location in the vehicle.

Example 7 is example 1, wherein the angular resolution $\theta_{RS}$ of the multi-static radar system is smaller than a native angular resolution $\theta_{rsi}$ of the radar sensor.

Example 8 is multi-static radar system for automotive radar sensing, comprising: a first radar sensor and a second radar sensor respectively disposed at a first location and a second location in a vehicle, at a distance from each other, to cooperatively generate a first and a second plurality of radar measurements of a surrounding of the vehicle, the first and second radar sensors having respective native angular resolutions of $\theta_{rs1}$ and $\theta_{rs2}$; and a physical processor coupled to the first and second radar sensors to provide control and synchronization signals to the first and second radar sensors to cause the first and second radar sensors to operate coherently with each other, and to process the first and second plurality of radar measurements to generate a radar point cloud of the surrounding, with an angular resolution of $\theta_{RS}$ that is smaller than both the native angular resolution of $\theta_{rs1}$ and the native angular resolution of $\theta_{rs2}$.

Example 9 is example 8, wherein the first and second radar sensors are disposed at the distance from each other, on a vertical, horizontal or angular axis, at a side of the vehicle.

Example 10 is example 8, wherein the first and second radar sensors are disposed at the distance from each other, on a vertical, horizontal or angular axis, at a front of the vehicle.

Example 11 is example 10, wherein the first and second radar sensors are disposed at the distance from each other, on a vertical, horizontal or angular axis, at the front of the vehicle, the distance being a first distance; and wherein the multi-static radar system further comprises a third radar sensor disposed at a third location in the vehicle, at a second distance on a first angular axis from the first radar sensor, and a third distance on a second angular axis from the second radar sensor, to cooperate with the first and second radar sensors to generate a third plurality of radar measurements of the surrounding, the third radar sensor having a native angular resolution of $\theta_{rs3}$.

Example 12 is example 11, wherein the physical processor is further coupled to the third radar sensor, and provide control and synchronization signals to the third radar sensors to cause the third sensor to operate coherently with the first and second radar sensors, and to process the third plurality of radar measurements in conjunction with the first and second plurality of radar measurements to generate the radar point cloud; and wherein the angular resolution of $\theta_{RS}$ is further smaller than the native angular resolution of $\theta_{rs3}$.

Example 13 is example 8, wherein the physical processor is coupled to the first and second radar sensors via respective wire lines or a common bus.

Example 14 is example 8, wherein the physical processor is wirelessly coupled to the first and second radar sensors via respective dedicated communication or radar channels.

Example 15 is example 14, wherein the dedicated communication channels are in one or more unregulated frequencies.

Example 16 is example 15, wherein the one or more unregulated frequencies are proximately located near a regulated frequency band for vehicular communications.

Example 17 is example 8, wherein the first and second radar sensors are arranged, so when the first and second plurality of radar measurements are combined to produce the radar point cloud, the angular resolution of $\theta_{RS}$ is smaller than 0.2°.

Example 18 is example 8, wherein the physical processor is a part of a selected one of the first or the second radar sensor.

Example 19 is a method for automotive radar sensing, comprising: providing a first radar sensor for placement at a first location in a vehicle, the first radar sensor having a first native angular resolution of $\theta_{rs1}$; providing a second radar sensor for placement at a second location in a vehicle, at a distance on a vertical, horizontal or angular axis from each other, the second radar sensor having a second native angular resolution of $\theta_{rs2}$; and on placements of the first and second radar sensors at the first and second locations in the vehicle, causing the first and second radar sensors to cooperate and respectively generate a first and a second plurality of radar measurements of a surrounding of the vehicle; wherein the first and second plurality of radar measurements are processed in combination to generate a radar point cloud of the surrounding of the vehicle; and wherein the placement of the second radar sensor at the distance from the first radar sensor on the vertical, horizontal or angular axis provides the combination of the first and second radar sensors to form a multi-static radar system with an angular resolution of $\theta_{RS}$ that is smaller than both the angular resolution of $\theta_{rs1}$ and the angular resolution of $\theta_{rs2}$.

Example 20 is example 19, wherein providing the first and second radar sensors for placement comprises providing the first and second radar sensors for placement at a distance from each other on the vertical, horizontal or angular axis at a selected one of a front or a side of the vehicle.

Example 21 is example 19, wherein the distance is a first distance, and the method further comprises providing a third radar sensor for placement at a second distance on a first angular axis from the first radar sensor, and at a third distance on a second angular axis from the second radar sensor, to cooperate with the first and second radar sensors to generate a third plurality of radar measurements of the surrounding, the third radar sensor having a native angular resolution of $\theta_{rs3}$; wherein the third plurality of radar measurements is processed in conjunction with the first and second plurality of radar measurements to generate the radar point cloud, and wherein the angular resolution of $\theta_{RS}$ is smaller than all three angular resolutions of $\theta_{rs1}$, $\theta_{rs2}$, and $\theta_{rs3}$.

Example 22 is at least one computer-readable medium (CRM) having instructions stored therein, to cause an advanced driver assistance system (ADAS) in a vehicle, in response to execution of the instruction by the ADAS, to: provide control and synchronization signals to first and second radar sensors of the vehicle, to cause the first and second radar sensors to operate coherently with each other, the first and second radar sensors having respective native angular resolutions of $\theta_{rs1}$ and $\theta_{rs2}$, and are disposed in the vehicle to provide a combination of the first and second sensors to form a multi-static radar system with an angular resolution $\theta_{RS}$ that is smaller than both native angular resolution of $\theta_{rs1}$ and angular resolution of $\theta_{rs2}$; receive first and second plurality of radar measurements of a surrounding of the vehicle from the first and second radar sensors; and process the first and second plurality of radar measurements from the first and second radar sensors in combination to generate a radar point cloud.

Example 23 is example 22, wherein to provide control and synchronization signals to the first and second radar sensors comprises to cause transmission of the control and synchronization signals to the first and second radar sensors via respective dedicated communication or radar channels on one or more unregulated frequencies.

Example 24 is example 22, wherein the first and second plurality of measurements include respective range or doppler measurements, and wherein to process the first and second plurality of measurements to generate the radar point cloud comprises to process the respective range or doppler measurements.

Example 25 is example 22, wherein to provide further comprises to provide the control and synchronization signals to a third radar sensor of the vehicle, to cause the first, second and third radar sensors to operate coherently with each other, the third radar sensor having a native angular resolution of $\theta_{rs3}$, the combination further including the third radar sensor, and the first, second and third radar sensors are disposed to provide the multi-static radar system formed with the combination with the angular resolution $\theta_{RS}$ that is smaller than the native angular resolution of $\theta_{rs1}$, $\theta_{rs2}$ or $\theta_{rs3}$; and process the third plurality of measurements in conjunction with the first and second plurality of measurements to generate the radar point cloud.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A multi-static radar system for automotive radar sensing, comprising:
   a first radar sensor and a second radar sensor respectively disposed at a first location and a second location in a vehicle, at a distance from each other, to cooperatively generate a first and a second plurality of radar measurements of a surrounding of the vehicle, the first and second radar sensors having respective native angular resolutions of $\theta_{rs1}$ and $\theta_{rs2}$; and
   a physical processor coupled to the first and second radar sensors to:
      provide control and synchronization signals to the first and second radar sensors to cause the first and second radar sensors to operate coherently with each other, and
      process the first and second plurality of radar measurements to generate a radar point cloud of the surrounding with an angular resolution of $\theta_{RS}$ that is smaller than both the native angular resolution of $\theta_{rs1}$ and the native angular resolution of $\theta_{rs2}$.

2. The multi-static radar system of claim 1, wherein the first and second radar sensors are disposed at the distance from each other, on a vertical, a horizontal, or an angular axis, at a side of the vehicle.

3. The multi-static radar system of claim 1, wherein the first and second radar sensors are disposed at the distance from each other, on a vertical, a horizontal, or an angular axis, at a front of the vehicle.

4. The multi-static radar system of claim 3, wherein the first and second radar sensors are disposed at the distance from each other, on a vertical, a horizontal, or an angular axis at the front of the vehicle, the distance being a first distance and wherein the multi-static radar system further comprises a third radar sensor disposed at a third location in or on the vehicle, at a second distance on a first angular axis from the first radar sensor, and at a third distance on a second angular axis from the second radar sensor, to cooperate with the first and second radar sensors to generate a third plurality of radar measurements of the surrounding, the third radar sensor having a native angular resolution of $\theta_{rs3}$.

5. The multi-static radar system of claim 4, wherein the physical processor is further coupled to the third radar sensor, and the physical processor is to:
   provide control and synchronization signals to the third radar sensors to cause the third sensor to operate coherently with the first and second radar sensors; and
   process the third plurality of radar measurements in conjunction with the first and second plurality of radar measurements to generate the radar point cloud,
   wherein the angular resolution of $\theta_{RS}$ is further smaller than the native angular resolution of $\theta_{rs3}$.

6. The multi-static radar system of claim 1, wherein the physical processor is coupled to the first and second radar sensors via respective wire lines or a common bus.

7. The multi-static radar system of claim 1, wherein the physical processor is wirelessly coupled to the first and second radar sensors via respective dedicated communication or radar channels.

8. The multi-static radar system of claim 7, wherein the dedicated communication channels are in one or more unregulated frequencies.

9. The multi-static radar system of claim 8, wherein the one or more unregulated frequencies are proximately located near a regulated frequency band for vehicular communications.

10. The multi-static radar system of claim 1, wherein the first and second radar sensors are arranged, so when the first and second plurality of radar measurements are combined to produce the radar point cloud, the angular resolution of $\theta_{RS}$ is smaller than 0.2°.

11. The multi-static radar system of claim 1, wherein the first radar sensor includes the physical processor or the second radar sensor includes the physical processor.

12. A method for automotive radar sensing, comprising:
   providing a first radar sensor for placement at a first location in a vehicle, the first radar sensor having a first native angular resolution of $\theta_{rs1}$;
   providing a second radar sensor for placement at a second location in the vehicle, at a distance on a vertical, a horizontal, or an angular axis from each other, the second radar sensor having a second native angular resolution of $\theta_{rs2}$; and
   on placements of the first and second locations in the vehicle, causing the first and second radar sensors to cooperate and respectively generate a first and a second plurality of radar measurements of a surrounding of the vehicle,
   wherein the first and second plurality of radar measurements are processed in combination to generate a radar point cloud of the surrounding of the vehicle, and
   wherein the placement of the second radar sensor at the distance from the first radar sensor on the vertical, horizontal, or angular axis provides the combination of the first and second radar sensors to form a multi-static radar system with an angular resolution of $\theta_{RS}$ that is smaller than both the first native angular resolution of $\theta_{rs1}$ and the second native angular resolution of $\theta_{rs2}$.

13. The method of claim 12, wherein providing the first and second radar sensors for placement comprises providing the first and second radar sensors for placement at a distance from each other on the vertical, horizontal, or angular axis at a selected one of a front or a side of the vehicle.

14. The method of claim 12, wherein the distance is a first distance, and the method further comprises:
   providing a third radar sensor for placement at a second distance on a first angular axis from the first radar sensor, and at a third distance on a second angular axis from the second radar sensor, to cooperate with the first and second radar sensors to generate a third plurality of radar measurements of the surrounding, the third radar sensor having a native angular resolution of $\theta_{rs3}$;

wherein the third plurality of radar measurements is processed in conjunction with the first and second plurality of radar measurements to generate the radar point cloud, and wherein the angular resolution of $\theta_{RS}$ is smaller than all three angular resolutions of $\theta_{rs1}$, $\theta_{rs2}$, and $\theta_{rs3}$.

15. At least one non-transitory computer-readable medium (NTCRM) comprising instructions stored therein, wherein execution of the instructions by an advanced driver assistance system (ADAS) in a vehicle is to cause the ADAS to: provide control and synchronization signals to first and second radar sensors of the vehicle, to cause the first and second radar sensors to operate coherently with each other, the first and second radar sensors having respective native angular resolutions of θrs1 and θrs2, and are disposed in the vehicle to provide a combination of the first and second sensors to form a multi-static radar system with an angular resolution of $\theta_{RS}$ that is smaller than both the native angular resolution of $\theta rs_1$ and the native angular resolution of θrs2; receive a first and a second plurality of radar measurements of a surrounding of the vehicle from the first and second radar sensors; and process the first and second plurality of radar measurements from the first and second radar sensors in combination to generate a radar point cloud.

16. The NTCRM of claim 15, wherein to provide control and synchronization signals to the first and second radar sensors comprises to cause transmission of the control and synchronization signals to the first and second radar sensors via respective dedicated communication or radar channels on one or more unregulated frequencies.

17. The NTCRM of claim 15, wherein the first and second plurality of measurements include respective range or Doppler measurements and wherein to process the first and second plurality of measurements to generate the radar point cloud comprises to process the respective range or Doppler measurements.

18. The NTCRM of claim 15, wherein, to provide the control and synchronization signals, execution of the instructions is to cause the ADAS to:

provide the control and synchronization signals to a third radar sensor of the vehicle, to cause the first, second, and third radar sensors to operate coherently with each other, the third radar sensor having a native angular resolution of $\theta_{rs3}$, the combination further including the third radar sensor, and the first, second, and third radar sensors are disposed to provide the multi-static radar system formed with the combination with the angular resolution $\theta_{RS}$ that is smaller than the native angular resolution of $\theta_{rs1}$, $\theta_{rs2}$, or $\theta_{rs3}$; and process a third plurality of measurements in conjunction with the first and second plurality of measurements to generate the radar point cloud.

19. A multi-static radar system for automotive radar sensing, comprising:

a first radar sensor and a second radar sensor respectively disposed at a first location and a second location at or on a front or a side of a vehicle, wherein the first and second radar sensors are disposed at a first distance from each other on a vertical, a horizontal, or an angular axis, wherein the first and second radar sensors are to cooperatively generate a first and a second plurality of radar measurements of a surrounding of the vehicle, and the first and second radar sensors have respective native angular resolutions of $\theta_{rs1}$ and $\theta_{rs2}$;

a third radar sensor disposed at a third location in or on the vehicle at a second distance on a first angular axis from the first radar sensor, and at a third distance on a second angular axis from the second radar sensor, wherein the third radar sensor is to cooperate with the first and second radar sensors to generate a third plurality of radar measurements of the surrounding of the vehicle, and the third radar sensor has a native angular resolution of $\theta_{rs3}$; and a physical processor coupled to the first and second radar sensors to provide control and synchronization signals to the first and second radar sensors to cause the first and second radar sensors to operate coherently with each other, and to process the first and second plurality of radar measurements to generate a radar point cloud of the surrounding, with an angular resolution of $\theta_{RS}$ that is smaller than both the native angular resolution of $\theta_{rs1}$ and the native angular resolution of $\theta_{rs2}$.

20. The multi-static radar system of claim 19, wherein the physical processor is coupled to the third radar sensor, and the physical processor is to:

provide control and synchronization signals to the third radar sensors to cause the third sensor to operate coherently with the first and second radar sensors; and process the third plurality of radar measurements in conjunction with the first and second plurality of radar measurements to generate the radar point cloud, wherein the angular resolution of $\theta_{RS}$ is smaller than the native angular resolution of $\theta_{rs3}$.

21. The multi-static radar system of claim 19, wherein the physical processor is coupled to the first, second, and third radar sensors via respective wire lines or a common bus.

22. The multi-static radar system of claim 19, wherein the physical processor is wirelessly coupled to the first, second, and third radar sensors via respective dedicated communication or radar channels.

23. The multi-static radar system of claim 22, wherein at least one of the dedicated communication channels are in one or more unregulated frequencies, and the one or more unregulated frequencies are proximately located near a regulated frequency band for vehicular communications.

24. The multi-static radar system of claim 19, wherein the first and second radar sensors are arranged such that the angular resolution of $\theta_{RS}$ is smaller than 0.2° when the first and second plurality of radar measurements are combined to produce the radar point cloud.

25. The multi-static radar system of claim 19, wherein the first radar sensor includes the physical processor, the second radar sensor includes the physical processor, or the third radar sensor includes the physical processor.

* * * * *

UNITED STATES PATENT AND TRADEMARK OFFICE
CERTIFICATE OF CORRECTION

| | |
|---|---|
| PATENT NO. | : 11,747,457 B2 |
| APPLICATION NO. | : 16/452383 |
| DATED | : September 5, 2023 |
| INVENTOR(S) | : Yaron Kahana et al. |

It is certified that error appears in the above-identified patent and that said Letters Patent is hereby corrected as shown below:

In the Claims

Column 17, Claim 4:
Line 60, please insert a --,-- immediately after the word distance Signed and Sealed this
Eighth Day of October, 2024

Katherine Kelly Vidal
*Director of the United States Patent and Trademark Office*